Figures 1, 2:
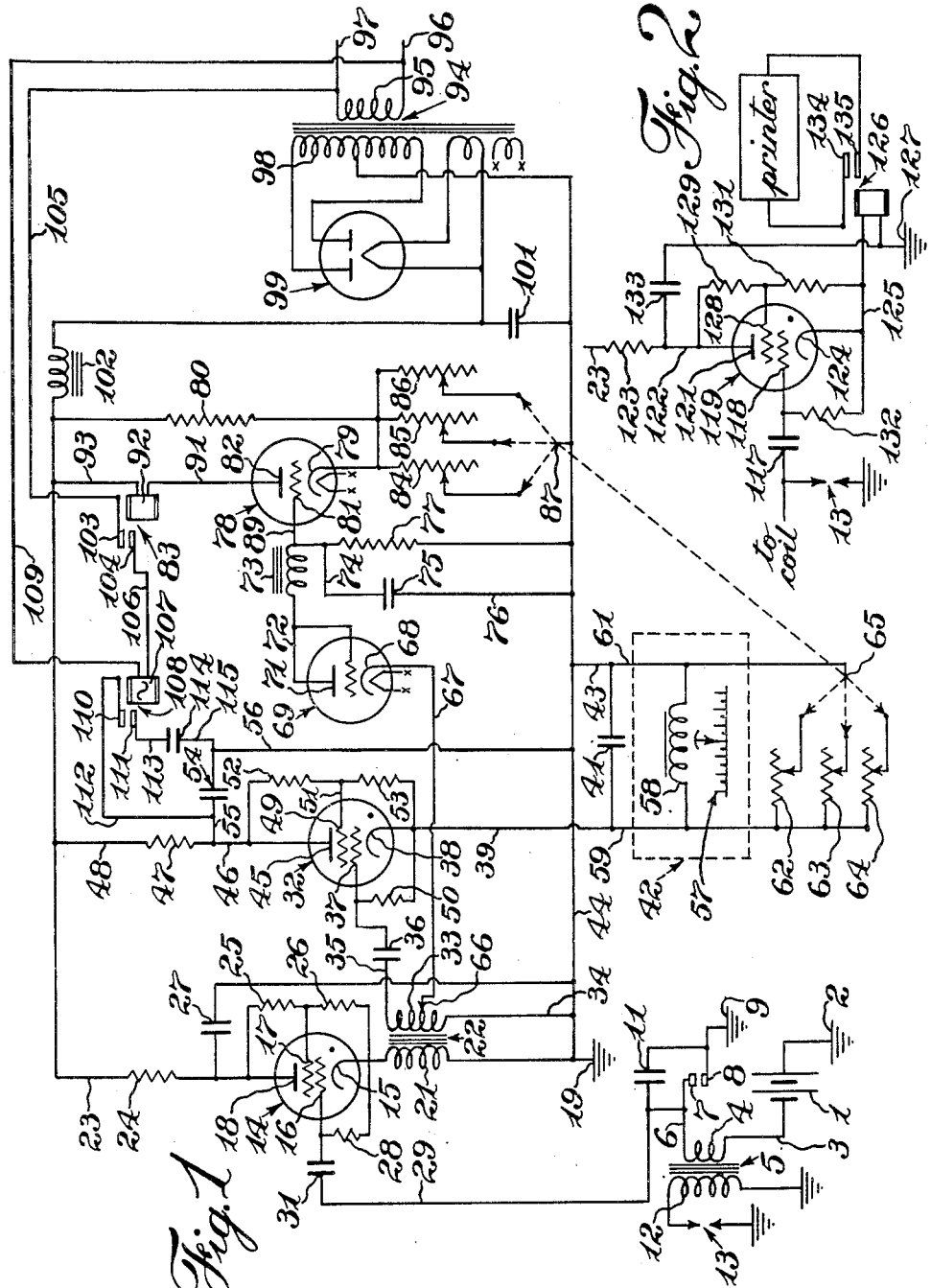

July 4, 1950

L. C. PARKER ET AL 2,513,668

RECORDING TACHOMETER

Filed April 29, 1947

WITNESS:
Esther M. Stockton

INVENTORS
Leland C. Parker
Edward B. Hackett
Patrick G. Pecoraro
BY Clinton L. Janes
ATTORNEY Patented July 4, 1950

2,513,668

UNITED STATES PATENT OFFICE 2,513,668

RECORDING TACHOMETER

Leland C. Parker, Elmira, Edward B. Hackett, Elmira Heights, and Patrick G. Pecoraro, Elmira, N. Y., assignors to Bendix Aviation Corporation, Elmira Heights, N. Y., a corporation of Delaware Application April 29, 1947, Serial No. 744,762

4 Claims. (Cl. 346—33)

The present invention relates to a recording tachometer and more particularly to a device for exhibiting or indicating and/or recording at a distance the functioning of internal combustion engines.

In the testing of internal combustion engines and their auxiliary equipment such as the starting system, it is very desirable to have a permanent record of the functioning thereof, such as the cranking R. P. M., the amount of cranking prior to firing, the acceleration caused by initial explosion, the timing of subsequent explosions, the number and character of false starts, the speed and uniformity of firing when a true start is secured, etc. Moreover, when such tests are conducted in cold rooms simulating winter starting conditions, it is advantageous to be able to locate the instrument outside the cold room where it may be operated, observed, entries made, charts changed etc. under normal temperature conditions. It is necessary, furthermore, that the exhibiting device have no effect on the functioning of any of the equipment being tested such as might occur for instance if current from the ignition circuit of the engine were used to operate the instrument.

It is an object of the present invention to provide a novel recording tachometer for internal combustion engines which is reliable and accurate in operation, simple and economical in construction, and readily adaptable for various types of engines It is another object to provide such a device which furnishes a continuous record of the speed of rotation of the engine at all times throughout the test.

It is another object to provide such a device which indicates clearly the failure to fire of any individual spark plug.

It is another object to provide such a device which shows the length of time elapsed, the number of revolutions of the engine and the number, time, and effectiveness of false starts which occur prior to the attainment of self operation by the engine.

It is another object to provide such a device which has a low speed range of operation for the cranking period, and a high speed range of operation for indicating and/or recording running conditions of the engine, with means for automatically shifting from one range to the other as required.

It is another object to provide such a device which does not use current from the ignition circuit of the engine to actuate the instrument, so that the functioning of the ignition system is entirely unaffected by the exhibiting device.

Further objects and advantages will be apparent from the following description taken in connection with the accompanying drawing in which:

Fig. 1 is a diagrammatic illustration of one preferred form of the present invention; and Fig. 2 shows diagrammatically an indicating device for use in connection with the tachometer shown in Fig. 1.

In Fig. 1 of the drawing there is indicated diagrammatically a conventional form of ignition system for an internal combustion engine comprising a battery 1, the positive terminal of which is grounded at 2, the negative terminal being connected by a lead 3 to one end of the primary winding 4 of a transformer 5. The other end of the primary winding is connected by a lead 6 to a movable breaker point 7 which cooperates with a fixed contact 8 that is grounded at 9. A condenser 11 is bridged across the breaker points to reduce erosion of the points and increase the effectiveness of the transformer spark coil 5. The secondary 12 of the spark coil is connected to the spark plugs of the engine, one of which is indicated at 13.

It will be understood that the operation of the engine causes the breaker points 7, 8 to be opened and closed in synchronism with the rotation of the engine so as to produce sparks in the spark plugs 13 at the proper time to ignite the charge in the corresponding cylinder of the engine.

The present invention provides means for indicating and/or recording each discharge across the gap of a spark plug 13, and for showing the frequency of such discharges. For this purpose advantage is taken of the fact that when the secondary 12 of the spark coil 5 discharges across a spark plug gap, the momentary surge of secondary current induces a transient in the primary 4 of the spark coil which, although of very short duration, has a very high voltage as compared to the voltage of the battery. This transient voltage is used to trigger a normally non-conductive gaseous tube, the output of which controls the exhibiting device.

As here shown, a gaseous discharge tube 14 is provided having a cathode 15, a control grid 16, a screen grid 17, and an anode 18. The cathode 15 is connected to the ground at 19 through the primary 21 of a transformer 22. The anode 18 is connected to a plate voltage supply lead 23 through a resister 24 having such a value as to prevent sufficient current from flowing through the tube 14 to maintain its conductivity. The screen grid 17 is maintained at a suitable voltage by means of a voltage divider 25, 26 bridged across the cathode and anode, and a condenser 27 is connected between the anode 18 and the ground.

The control grid 16 is provided with a grid leak 28 connected to the cathode to maintain the grid normally at a suitable negative bias to maintain the tube non-conductive and means for triggering the tube or causing it to become conductive is provided in the form of a connection 29 from the primary lead 6 of the ignition circuit to the control grid 16, a blocking condenser 31 being inserted in said connection to prevent the flow of direct current therethrough. It will be seen that this arrangement permits the transient induced in the primary 4 of the spark coil 5 when a spark plug fires; to place an instantaneous positive voltage on the control grid 16 of tube 14 sufficient to trigger the tube, without permitting any of the battery current in the primary circuit to flow through the connection 29.

The output of the tube 14 is used to trigger a second similar tube 32 the function of which is to actuate the recording device. For this purpose, secondary 33 of the transformer 22 is grounded at one end by a lead 34 while the opposite end of the secondary is connected by a lead 35 through a blocking condenser 36 to the control grid 37 of the tube 32. The cathode 38 of tube 32 is connected by a lead 39 to one side of a storage or "tank" condenser 41 forming part of the exhibiting device indicated generally by numeral 42, the opposite terminal of the condenser 41 being connected by a lead 43 to the ground lead 44. The anode or plate 45 of tube 32 is connected by a lead 46 to a resister 47 which is connected by a lead 48 to the plate voltage supply lead 23. The screen grid 49 of tube 32 is maintained at a proper positive potential by a connection 51 to a voltage divider 52, 53 connected between the plate and cathode of tube 32, while the control grid 37 is normally maintained negative with respect to the cathode by means of a grid leak 50. A supply or "bucket" condenser 54 is connected by a lead 55 to the plate lead 46, and by a lead 56 to the ground lead 44, and consequently to the lead 43 of the storage condenser 41. When the tube 32 is conductive, the supply condenser 54 is thus connected to the storage condenser 41 so as to impart the charge of the supply condenser to the storage condenser.

The exhibiting instrument 42 further comprises a recording voltmeter indicated generally by numeral 57, the coil 58 of which is connected by leads 59 and 61 to the terminals of the storage condenser 41 so that the voltmeter indicates the charge existing in the storage condenser. A plurality of resisters 62, 63 and 64 are directly connected to the voltmeter lead 59 on the one end, and are selectively connected by means of a switch 65 to the other voltmeter lead 61. These resisters are arranged to continually bleed off the charge of the storage condenser 41 at a rate depending on the value of the particular resister in use. Since this charge is built up by the periodic discharges of the supply condenser 54 into the storage condenser, which take place whenever a spark plug fires, the voltage existing across the voltmeter terminals at any instant is a function of the frequency of such firing. The voltmeter may consequently be calibrated in revolutions per minute of the engine. The various resisters are of the proper value to secure suitable coordinate readings of the meter 57 when engines having different numbers of cylinders are being tested. In other words, if the resister 62 is of such a value that the meter 57 will read correctly in R. P. M. of the engine when a four cylinder engine is being tested, the resister 63 may be arranged to provide the same reading with a six cylinder engine, and resister 64 with an eight cylinder engine.

Since the running speed of the engine may be much higher than the cranking speed, it is desirable that the instrument be provided with a low speed range for use during the cranking period, and a high speed range when the engine is rotating above a predetermined speed. For this purpose the secondary 33 of the transformer 22 is tapped at 66 and pulses of current conducted therefrom by a lead 67 to the cathode 68 of a rectifying tube 69. The plate 71 of the rectifying tube is connected by a lead 72 through a choke 73 and lead 74 to a second storage condenser 75 which is connected by a lead 76 to the ground lead 44 to complete the circuit. A bleeder resister 77 is connected across the storage condenser 75. The rectified current from the tube 69 is thus filtered by the choke 73 and condenser 75 and traverses the resister 77 as pure direct current. As the frequency of the pulses from the transformer 22 increases, the resulting direct current through the resister 77 increases, thus increasing the voltage drop across the resistor, whereby the instantaneous voltage of the lead 74 with respect to ground is a function of the frequency of the pulses passing through the transformer 22.

A control tube 78 having a cathode 79, control grid 81, and a plate 82 is arranged to control the actuation of a relay 83 for bringing about a shift from one range to the other of the meter. For this purpose the cathode 79 is tapped into a voltage divider formed by a resister 80 connected to the plate voltage supply lead 23, and a selected one of a plurality of resisters 84, 85 and 86; the selected resister being connected to ground by a switch 87 which is ganged with the switch 65 so that the cathode is biased positively with respect to ground by a voltage dependent on the position of switch 87. The grid 81 of the control tube 78 is connected by a lead 89 to the lead 74 of the second storage condenser 75 so that the voltage of the grid with respect to ground depends on the state of charge of said condenser. The plate 82 of the control tube is connected by a lead 91 to the coil 92 of relay 83, the other terminal of which coil is connected by a lead 93 to the plate voltage supply lead 23. The plate voltage supply comprises a transformer 94, the primary 95 of which is connected to the power supply mains 96 and 97. The output of the secondary 98 of transformer 94 is rectified by the rectifier tube 99, and filtered by a condenser 101 and choke 102, which latter is connected to the plate voltage supply lead 23.

Relay 83 is provided with a pair of contacts 103 and 104 which are normally open and are closed when the coil 92 is energized. Contact 103 is connected by lead 105 to the power main 97 while contact 104 is connected by a lead 106 to one terminal of the coil 107 of an alternating current relay 108. The opposite terminal of coil 107 is connected by the lead 109 to the other power main 96.

Relay 108 is provided with contacts 110 and 111 which are normally open and adapted to be closed when coil 107 is energized. Contact 110 is connected by a lead 112 to the lead 55 of the supply condenser 54. Contact 111 is connected by a lead 113 to one terminal of a second supply condenser 114, the opposite terminal of which is connected by a lead 115 to the other terminal of the first supply condenser 54. It will thus be seen that when the contacts 110, 111 are closed, the two supply condensers 54 and 114 are connected in parallel so as to add the capacity of condenser 114 to that of condenser 54, but when contacts 110, 111 are open, the second supply condenser 114 is disconnected.

Tubes 14 and 32 are normally non-conductive by reason of the negative bias on their control grids 16 and 37 respectively. Condensers 27 and 54 are charged from the plate supply voltage. Control tube 78 is normally conductive since the cathode resisters 84, 85 or 86 do not bias the grid 81 of the tube to cutoff. The plate current flowing through the coil 92 of relay 83 consequently holds contacts 103, 104 closed, which causes closure of contacts 110, 111 of relay 108 so that the second supply condenser 114 is connected in parallel with the first supply condenser 54. This is the low scale condition of the instrument.

In operation, when the engine to be tested is cranked, the ignition circuit of the engine is operated to cause the spark plugs 13 to fire. The transient induced in the primary 4 of the ignition coil 5 by each discharge across a spark plug gap provides a momentary positive charge on the grid 16 of tube 14, thus triggering the tube and permitting the condenser 27 to discharge through the tube thus causing a pulse of current through the primary 21 of transformer 22. As soon as the condenser 27 has discharged sufficiently, the tube 14 heals, since the resister 24 will not pass sufficient current to maintain the tube conductive, and the condenser 27 is immediately recharged.

The pulse through the primary 21 of transformer 22 places a positive charge on the grid 37 of tube 32 thus triggering this tube and permitting the supply condensers 54 and 114 to discharge into the storage condenser 41. As soon as this takes place the tube 32 heals and the supply condensers 54 and 114 become recharged through the resister 47. Each discharge into the storage condenser 41 causes an increase in the reading of the voltmeter 57 and since the charge of the storage condenser is constantly being bled off by any one of the resisters 62, 63 or 64, the reading of the voltmeter indicates directly the frequency of the charges received from the supply condensers, and accordingly the frequency of the firing of the spark plugs 13.

The pulses transmitted through the tap 66 of the secondary of the transformer 22, after being rectified by the tube 69, charge the condenser 75, the condenser lead 74 becoming negative with respect to ground. This increases the negative bias on the grid 81 with respect to the cathode 79 of the control tube 78, such increase being controlled by the resister 77. When the pulses occur above a predetermined frequency, grid 81 becomes biased to cutoff, thereby deenergizing coil 92 of relay 83 and permitting contacts 103, 104 to open. This deenergizes coil 107 of relay 108, thus permitting contacts 110, 111 to open and disconnect the second supply condenser 114. Thereafter the charges received by the storage condenser 41 are correspondingly reduced in amount so as to provide a high speed range for the recording instrument.

It will be understood that the voltmeter employed may be of any commercial type, preferably incorporating the usual stylus and uniformly movable chart for making the desired record.

Fig. 2 of the drawing shows means adapted to be used in conjunction with the tachometer structure above set forth, for identifying on the chart of the tachometer the record of firing of any individual spark plug. As there shown, one of the spark plugs 13 is connected through a blocking condenser 117 to the control grid 118 of a gaseous discharge electronic tube 119. The plate 121 of this tube is connected through a lead 122 and a resister 123 to the plate voltage supply lead 23. The cathode 124 of the tube is connected by a lead 125 to one end of the coil of a relay 126, the opposite end of which is grounded as shown at 127. The screen grid 128 of the tube is maintained at a suitable potential by connection with a voltage drivider 129, 131 bridged across the leads 122 and 125; and the control grid 118 is normally maintained at a suitable negative bias to render the tube non-conductive, by means of a grid leak 132 connected to the cathode lead 125. A condenser 133 of suitable capacity for operating the relay 126 is connected between the plate lead 122 and the ground terminal of the relay whereby discharge of the condenser through tube 119 energizes the relay. The contacts 134 and 135 of the relay are arranged to control any suitable form of printing mechanism, as indicated, to impress a mark on the chart of the tachometer whenever the printer is actuated.

In the operation of this recording device, whenever the particular spark plug 13 which is connected to this device receives energy from the spark coil 5, the voltage thereof charges the condenser 117 so as to place a momentary positive charge on the control grid 118 of tube 119 sufficient to trigger the tube. The condenser 133 is normally by reason of its connection through the resister 123 to the plate voltage supply, so that when the tube 119 becomes conductive, the condenser discharges through the tube and the relay 126, thereby operating the printer so as to place a mark opposite the record of that particular spark plug 13 on the chart of the tachometer. Obviously, when one spark plug is thus identified, the other plugs may be also identified by reference to the firing order of the particular engine under test.

Although certain elements have been shown and described in detail, it will be understood that other embodiments of the invention are possible, and various changes may be made in the structure and arrangements illustrated without departing from the scope of the invention as defined in the claims appended hereto.

What is claimed is:

1. In combination with an internal combustion engine having an ignition system including a transformer and spark plugs connected to the secondary thereof, a storage condenser, a supply condenser, means for charging the supply condenser, means for discharging the supply condenser into the storage condenser including a normally nonconductive grid controlled gaseous thermionic tube, means for generating an electrical pulse in response to the transient generated in the primary of said transformer by the discharge of the secondary thereof across the gap of a spark plug including a second grid controlled gaseous thermionic tube and a connection from the primary of said transformer to the grid of said second mentioned tube, means transmitting said pulses to the grid of the first mentioned thermionic tube to trigger said tube, a calibrated resister bridging the storage condenser and means for continuously recording the state of charge of the storage condenser.

2. The combination set forth in claim 1 including further a second supply condenser normally in parallel with the first supply condenser, a second storage condenser, a calibrated resister bridging the second storage condenser, means charging said second storage condenser from said pulses, and means responsive to a predetermined charge in the second storage condenser for disconnecting the second supply condenser from the first supply condenser.

3. An electronic recording tachometer including a storage condenser, a supply condenser, means for charging the supply condenser; means including a normally non-conductive gaseous discharge thermionic tube for connecting the supply condenser to discharge it into the storage condenser; means responsive to the recurrent phenomena to be recorded for producing a pulse of electrical voltage and causing the pulse to trigger said tube so as to render it conductive; means causing the tube to heal and become non-conductive when the supply condenser has discharged into the storage condenser so as to allow the supply condenser to recharge, a calibrated resister connected to bleed off the charge of the storage condenser; and means for continuously indicating the state of charge of the storage condenser; including further a second supply condenser normally connected in parallel with the first supply condenser; and means responsive to the recurrence of said pulse above a predetermined frequency to disconnect said second supply condenser.

4. An electronic recording tachometer including a storage condenser, a supply condenser, means for charging the supply condenser; means including a normally non-conductive gaseous discharge thermionic tube for connecting the supply condenser to discharge it into the storage condenser; means responsive to the recurrent phenomena to be recorded for producing a pulse of electrical voltage and causing the pulse to trigger said tube so as to render it conductive; means causing the tube to heal and become non-conductive when the supply condenser has discharged into the storage condenser so as to allow the supply condenser to recharge, a calibrated resister connected to bleed off the charge of the storage condenser; and means for continuously indicating the state of charge of the storage condenser; including further, a second supply condenser normally connected in parallel with the first supply condenser, a second storage condenser; means for rectifying said pulses and causing them to charge the second storage condenser; a calibrated resister connected across said second storage condenser to bleed off the charge thereon; and means responsive to a predetermined charge of the second storage condenser for disconnecting the second supply condenser.

LELAND C. PARKER.
EDWARD B. HACKETT.
PATRICK G. PECORARO.

REFERENCES CITED

The following references are of record in the file of this patent:

UNITED STATES PATENTS

| Number | Name | Date |
|---|---|---|
| 1,957,432 | Barnes | May 8, 1934 |
| 2,202,900 | Draper | June 4, 1940 |
| 2,226,185 | Sturm et al. | Dec. 24, 1940 |
| 2,232,959 | Miller | Feb. 25, 1941 |
| 2,260,933 | Cooper | Oct. 28, 1941 |
| 2,325,927 | Wilbur | Aug. 3, 1943 |

OTHER REFERENCES

Article by Straus, "Electronics" for May 1945, pp. 150, 152, 154.

Article in "Electronics Industries," March 1945, pp. 80, 81, 208.